United States Patent [19]

Yasunaga et al.

[11] Patent Number: 4,963,885

[45] Date of Patent: Oct. 16, 1990

[54] THERMAL HEAD PRINTER

[75] Inventors: Soichiro Yasunaga; Isamu Watanabe, both of Kawasaki, Japan

[73] Assignee: Oshida Patent Agency, Tokyo, Japan

[21] Appl. No.: 483,629

[22] Filed: Feb. 23, 1990

[51] Int. Cl.$^5$ .......................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS 4,656,489 4/1987 Sato et al. ...................... 346/76 PH 4,737,229 4/1988 Vanderpool et al. .......... 346/76 PH

*Primary Examiner*—Bruce A. Reynolds

*Assistant Examiner*—Huan Tran

*Attorney, Agent, or Firm*—William J. Daniel

[57] ABSTRACT

A thermal print head includes a plurality, e.g., three of delay shift registers operating by a clock-controlled shift scan to receive dot print signals from a dot print signal generating circuit. The delay registers have a number of addresses corresponding to the number of dot print elements in the printer head. The dot print signals from the delay shift registers are applied to an OR gate connected to the print registers for the dot print elements. With this construction, the shift scan cycle t is set so that t=T (n+1), where T is the least print cycle under normal printing conditions and n is the number of delay shift registers. Printing is effected with a high resolving power to restrain any decline in coloring properties using interpolation dot print signals derived from real time print signals by the delay shift registers. The real time signals ae obtained by sampling an analogue wave as a digitized value and counting the number of clock pulse needed to equal this digitized value, at which time a signal is given.

1 Claim, 3 Drawing Sheets

THERMAL HEAD PRINTER

BACKGROUND OF THE INVENTION

The present invention relates to a thermal head printer including a thermal print head carrying linearly arrayed dot print elements to which are applied print signals from shift registers undergoing a clock-controlled shift scan and having a number of addresses corresponding to the number of dot elements, and a dot print signal generating circuit for outputting a dot print signal just when the number of clocks pulses, e.g. as counted by a counter, corresponds to the level, e.g., in digitized form, of each of a series, input signals derived, e.g., by sampling a waveform, the printer being adapted to effect simultaneous one-line dot printing in accordance with the dot print signals stored in the shift registers in response to print command signals.

In a typical arrangement of this type of thermal head printer used for performing dot printing with a high resolving power by, e.g., sampling analog waveforms, the dot print signals are supplied at high velocity to shift registers incorporated into the thermal print head, and the dot print elements may in principle be operated at a corresponding velocity.

Actually, however, the printing speed is so restricted that the dot print elements are exothermically responsive to a heat-sensitive chart.

SUMMARY OF THE INVENTION

It is a primary object of the present invention to eliminate the foregoing problem peculiar to the prior art and to provide a novel thermal head printer capable of enhanced resolving power by an apparent improvement in the response speed of dot print elements with a slight addition of electrical circuitry.

To this end, according to one aspect of the invention, there is provided a thermal head printer comprising: a thermal print head carrying linearly arrayed dot print elements to which are connected print shift registers undergoing a clock-controlled shift scan and having a number of addresses corresponding to the number of dot elements: and a dot print signal generating circuit for outputting dot print signals just when the number of clock pulses, re-set for each scan, equals the level of each of a series of input signals, the printer being adapted to effect in response to a printer command signal simultaneous one-line dot printing in accordance with the dot print signals which are stored in predetermined addresses of the shift registers by the shiftscanning operation, which is further characterized by: a plurality of serially connected shift registers undergoing a clock-controlled shift scan for receiving the dot print signals outputted from the dot print signal generating circuit, each register having a number of addresses corresponding to the number of the dot print elements; an OR gate to which is applied the dot print signals outputted from these shift registers, wherein a cycle t of the clock-controlled shift scanning operation of the shift registers is set so that $t \leqq T/(n+1)$ (where T is the least or shortest print cycle to which the dot print elements are normally responsive, and n is the number of serially connected shift registers), and the output signals of the OR gate being supplied to the shift registers of the thermal print head.

As illustrated in FIG. 1, if $n=2$ and $t=T/3$, during the shortest or least print cycle T with respect to realtime dot print $D_{-1}$, $D_0$, $D_1$, $D_2$ etc. signals generated by sampling input waveform A there are created, e.g., from the signal $D_0$ obtained during scan (0), two levels of interpolation print signals $D_{01}$ and $D_{02}$ which are delayed sequentially through the shift scanning cycles in which the interpolation serially-connected delay shift registers are shifted. Similarly, there are created couples of interpolation dot print signals . . . $D_{-31}$, $D_{-32}$; $D_{-21}$, $D_{-22}$; $D_{-11}$, $D_{-12}$; $D_{-11}$, $D_{12}$; $D_{21}$, $D^{22}$; $D_{31}$, $D_{32}$ . . . with respect to realtime dot print signals .:. $D_{-3}$, $D_{-2}$, $D_{-1}$, $D_{-2}$, $D_2$, $D_3$, . . . during the previous and subsequent shift scanning operations for scans (−3), (−2), (−1), (0), (1), etc.

Loaded to the shift registers of the thermal print head from the OR gate are the dot print signal $D_{-11}$ from the next previous shift scanning cycle (−1) and the dot print signal $D_{-22}$ from the second previous shift scanning cycle (−2) which have already been created before the shift scanning cycle (0) for forming the dot print signal $D_0$. Immediately after effecting this shift scan, one-line printing is simultaneously performed by the dot print elements. Thus, at the next shift scanning for scan (1) cycle, the first interpolation dot print signal $D_{01}$ delayed by one shift scanning cycle t is printed, and at the subsequent shift scanning cycle the second interpolation dot print signal $D_{02}$ delayed by two shift scanning cycles t is printed. More specifically, the thermal print head effects the printing process at a velocity which is three times as high as the least print cycle T with respect to the input waveforms A. Even when each heating time is short, the print element driving process is effected three times during the least print cycle T. As a result, the heating time typically increases, thereby carrying out the print with a high resolving power under such condition that any decline in coring properties is compensated.

BRIEF DESCRIPTION OF THE DRAWINGS

Other objects and advantages of the present invention will become more apparent during the following discussion taken in conjunction with the accompanying drawings, in which.

DESCRIPTION OF THE PREFERRED EMBODIMENT

One embodiment of a thermal head printer according to the present invention will hereinafter be described in detail with reference to the accompanying drawings.

Figure 1:
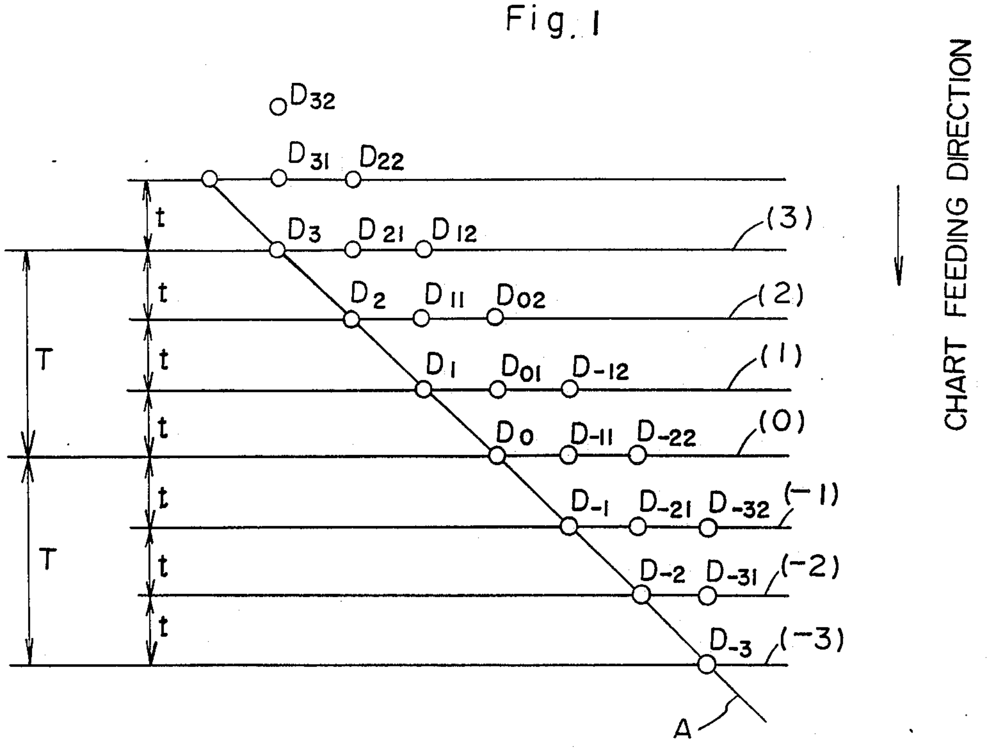
FIG. 1 is a diagram helpful in understanding the principle of the present invention.
Figure 2:
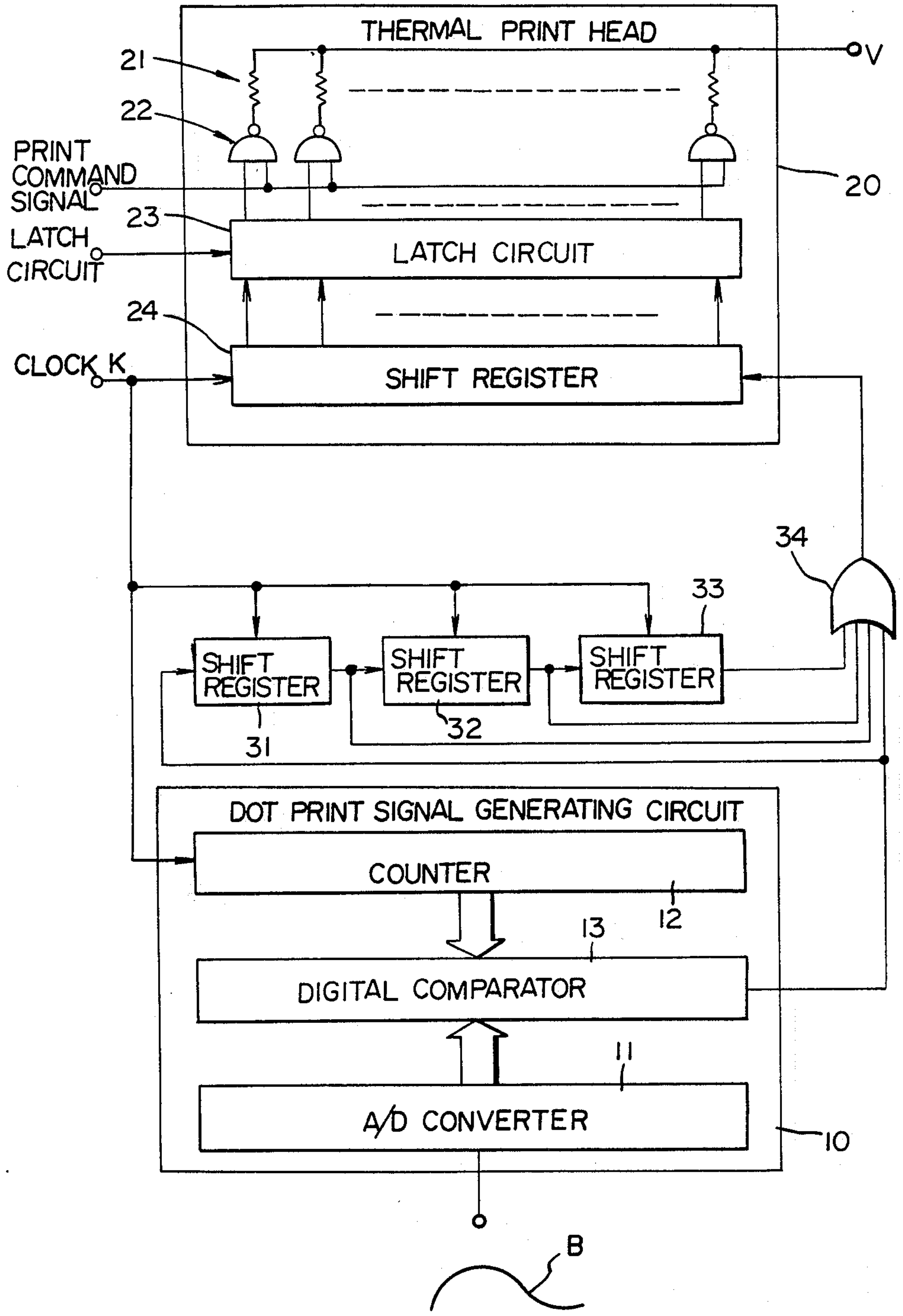
FIG. 2 is a schematic diagram of an electrical circuit constituting one embodiment of the invention.
Figure 3A:
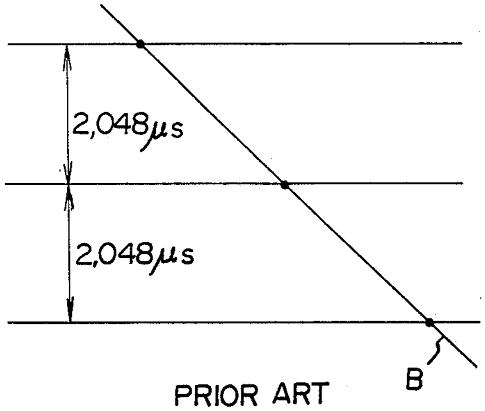
FIGS. 3(*a*) and 3(*b*) are diagrams helpful in understanding the operation of the embodiment of the invention in FIG. 2 and also the operation of the prior art.
Figure 3B:
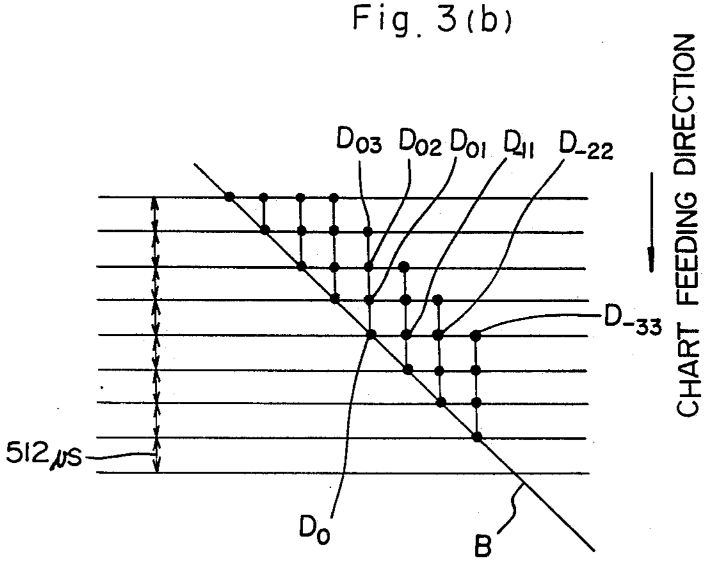
PRIOR ART Fig. 3(b)

Turning first to FIG. 2, there is illustrated in schematic fashion the circuitry of the thermal head printer according to one embodiment of the invention.

In FIG. 2, the numeral 10 generally represents a dot print signal generating circuit for converting into a dot print signal an analog waveform signal B to be inputted. The circuit 10 is composed of an A/D converter 11 for digitizing the analog waveform signal B by sampling, a counter 12 for counting the number of clock pulses from clock K for controlling shift scanning, and a digital comparator 13 for outputting as a dot print signal a coincidence signal at a Hi level (logic 1) when the counted number of clock pulses corresponds to the digitized value of the sample of waveform signal B generated by A/D converter 11.

A thermal print head generally designated 20 consists of 2,048 exothermic elements or dot print elements 21, illustrated as resistors, gates 22 corresponding to elements 21 which open in response to print command signals, a latch circuit 23 for outputting latch signals for the addresses of the respective gates, and a shift register 24 for outputting to the latch circuit the dot print signals corresponding to addresses thereof.

A cycle of the clock K is set for 0.25 us (4 MHz), and hence a shift scanning cycle, i.e., the cycle at which the latch signal and the print command signal are generated, is determined as follows: 0.25 us$\times$2,048=512 us. On the other hand, the shortest cycle at which the dot print elements 21 are normally responsive is given approximately by 512 us$\times$4=2,048 us.

Numerals 31 through 33 denote data interpolation shift registers each of 2,048 stages, these three shift registers being serially connected with separate parallel outputs. To be specific, the shift register 31 functions to hold in the associated address by shift scanning the Hi level (logic 1) dot print signals applied thereto during each shift scan by the dot print signal generating circuit 10. The shift registers 32 and 33 are arranged to receive at the appropriate addresses dot print signals transferred thereto in sequence from the corresponding stages of the prior shift registers under the control of the clock K. Designated at 34 is an OR gate for inputting the dot print signals received directly from the dot print signal generating circuit 10 and also the delayed dot print signals from the parallel outputs of the three interpolation or delay shift registers 31 through 33.

The description will next turn to the operation of the thus constructed thermal head.

At the first cycle, i.e., for scan (0) of the four shift scanning cycles occurring during the least print cycle of 2,048 s, the dot print signal generating circuit 10 takes in the input waveform signals B and then generates, as an instantaneous digitized value corresponding thereto, the dot print signals $D_0$ when the number of clock pulses counted by counter 12 is equal to that digitized value. The realtime dot print signals $D_0$ from scan 0 are in turn supplied in parallel to the OR gate 34 and the shift register 31. Therefore, the signal $D_0$ is outputted in the form of the one-scan delayed dot print signal $D_{01}$ from the shift register 31 during the next shift scanning cycle (1) and is then loaded into the shift register 32. During the following scan (2) signal $D_0$ is also outputted in the form of the two-scan delayed dot print signal $D_{02}$ from the shift register 32 and is then loaded into the shift register 33. During the shift scanning cycle (3) signal $D_0$ is outputted as the three-scan delayed dot print signal $D_{03}$ from the final shift register 33. The respective output signals from all three registers are applied in parallel to OR-gate 34.

Thus, there are created in sequence by three shift scanning cycles time delayed counterparts of the respective realtime dot print signals from the previous scanning cycles in progressively changing fashion. That is, each real-time signal is converted in turn into time-delayed counterpart signals as it is replaced by the next following real time signal and so on.

Loaded similarly from the delay shift registers 31 through 33 via the OR gate 34 into the print shift register 24 by shift scanning are the first interpolation dot print signal $D_{-11}$ from the next previous shift scanning cycle (−1), the interpolation dot print signal $D_{-22}$ from the second previous shift scanning cycle (−2) and the dot print signal $D_{-33}$ from the third previous shift scanning cycle (−3) which have already been created at the time of the generation of the real time dot print signals $D_0$. After this, the signals $D_0$, $D_{-11}$, $D_{-22}$ and $D_{-33}$ are held in the latch circuit 23 in response to the latch signals generated immediately after each shift scan. Then, under the control of a subsequently generated print command signal, the dot print elements 21 receive the latch-held signals and function to effect simultaneous one-line printing.

As described above, in connection with the data $D_0$, there are created the interpolations data $D_{01}$. $D_{02}$ and $D_{03}$ for every shift scan at a velocity four times higher than the least or shortest prior art print cycle of 2,048~s, thereby consecutively performing the print driving process four times. Hence, even though the exothermic response of the respective dot printing operations deceases, the print is carried out with an essentially trouble-free density. For example, a limit resolving power corresponds to the least print cycle of 2,048 us on the basis of the conventional method, if a normal density is to be secured.

In the embodiment given above, the thermal print head 20 itself is of known construction but behaves as if it were a novel thermal print head incorporating interpolation registers. The dot print signal generating circuit can also be constructed in a variety of forms to incorporate, e.g., a CPU for processing the data.

As discussed above, according to the present invention, it is possible to effect printing at a velocity higher than a typical maximum velocity of the thermal print head by a simple addition of circuit elements, thereby achieving printing having improved resolving power.

Although the illustrative embodiment of the present invention has been described in detail with reference to the accompanying drawings, it is to be understood that the present invention is not limited to this precise embodiment. Various changes or modifications may be effected therein by one skilled in the art without departing from the scope of spirit of the invention.

What is claimed is:

1. In a thermal head printer circuit comprising:

a thermal print head mounted with a plurality of linearly arrayed dot print elements to which are connected print shift registers undergoing a clock-controlled shift scan and having therein a number of addresses corresponding to the number of dot elements, and a dot print signal generating circuit for outputting dot print signals when the number of clock pulses from a clock re-set for each scanning cycle equals the level of each of a series of input signals, said print head being adapted to effect for each shift shift scanning cycle simultaneous one-line dot printing of said dot print signals which are loaded and held in predetermined addresses of said print shift registers by shift-scanning, in combination, the improvement comprising:

a plurality of serially connected delay shift registers undergoing a synchronous clock-controlled shift scan to which are inputted said dot print signals outputted from said dot print signal generating circuit, each such register having a number of addresses corresponding to the number of said dot print elements and being effective to output a plurality of consecutive time-delayed counterparts of each said dot print signal; and an OR gate to which are applied the time-delayed counterparts of said dot print signals outputted from said delay shift registers, and the current real-time dot print signal, wherein the cycle tune of time of the clock-controlled shift scanning operation of said shift registers is set according to the equation $t \leqq T/(n+1)$, where T is the least print cycle sufficient to make said dot print elements normally responsive, and n is the number of said serially connected delay shift registers, the output signals of said OR gate being supplied to said print shift registers of said thermal print head.

* * * * *